United States Patent
O'Kane

(10) Patent No.: US 11,763,388 B1
(45) Date of Patent: *Sep. 19, 2023

(54) VISUAL RECONSTRUCTION OF TRAFFIC INCIDENT BASED ON SENSOR DEVICE DATA

(71) Applicant: Esurance Insurance Services, Inc., San Francisco, CA (US)

(72) Inventor: Melissa Ann O'Kane, Roseville, CA (US)

(73) Assignee: Esurance Insurance Services, Inc., San Francisco, CA (US)

(*) Notice: Subject to any disclaimer, the term of this patent is extended or adjusted under 35 U.S.C. 154(b) by 102 days.

This patent is subject to a terminal disclaimer.

(21) Appl. No.: 16/913,650

(22) Filed: Jun. 26, 2020

Related U.S. Application Data

(63) Continuation of application No. 14/980,707, filed on Dec. 28, 2015.

(60) Provisional application No. 62/099,042, filed on Dec. 31, 2014.

(51) Int. Cl.
  *G06Q 40/08* (2012.01)
  *G06F 16/25* (2019.01)

(52) U.S. Cl.
  CPC .................. *G06Q 40/08* (2013.01); *G06F 16/258* (2019.01)

(58) Field of Classification Search
  None
  See application file for complete search history.

(56) References Cited

U.S. PATENT DOCUMENTS

| 7,411,493 | B2 | 8/2008 | Smith |
| 8,954,226 | B1* | 2/2015 | Binion et al. ......... G07C 5/008 701/33.4 |
| 9,639,978 | B2 | 5/2017 | Barfield, Jr. et al. |
| 2004/0103005 | A1 | 5/2004 | Wahlbin et al. |
| 2014/0279707 | A1 | 9/2014 | Joshua et al. |

OTHER PUBLICATIONS

Jun. 19, 2018 - (US) Non-Final Office Action - U.S. Appl. No. 14/980,707.
May 6, 2020 - (US) Notice of Allowance - U.S. Appl. No. 14/980,707.
Feb. 7, 2019 - (US) Final Office Action - U.S. Appl. No. 14/980,707.
Nov. 6, 2019 - (US) Non-Final Office Action - U.S. Appl. No. 14/980,707.

* cited by examiner

*Primary Examiner* — Jason M. Borlinghaus
(74) *Attorney, Agent, or Firm* — Polsinelli PC

(57) ABSTRACT

A system, a method, and a computer program product for providing a recreation of an event are disclosed. A plurality of data is received from a plurality of sources of information. The plurality of data describes an event. Each data in the plurality of data has a different format. Each data in the plurality of data is converted into a predetermined format. The converted received plurality of data is combined. Based on the combined converted received data, a report describing a recreation of the event is generated. The generated report is transmitted for display on at least one user interface.

20 Claims, 8 Drawing Sheets

VISUAL RECONSTRUCTION OF TRAFFIC INCIDENT BASED ON SENSOR DEVICE DATA

CROSS REFERENCE TO RELATED APPLICATIONS

This application is a continuation of U.S. Pat. Application Serial No. 14/980,707, filed Dec. 28, 2015, entitled "Visual Reconstruction of Traffic Incident Based on Sensor Device Data," and claims priority to U.S. Provisional Pat. Application No. 62/099,042 to Melissa O'Kane, filed Dec. 31, 2014 and entitled "Visual Reconstruction of Traffic Incident Based on Sensor Device Data," and incorporates its disclosure herein by reference in its entirety.

TECHNICAL FIELD

In some implementations, the current subject matter generally relates to data processing and, in particular, to visual reconstruction of a traffic incident based on a sensor data.

BACKGROUND

Customers may insure property and/or items (e.g., vehicles, belongings, etc.) with an insurance provider. In some cases, if an insured item is damaged and/or destroyed, a customer may submit an insurance claim to the insurance provider so that a claims adjuster for the insurance provider can view the damage to the insured item to determine any liability with respect to the customer. For example, if an insured vehicle is damaged in a traffic incident (e.g., an accident), the customer may submit the insurance claim with information relating to the accident, including information relating to the condition of the damaged vehicle.

In certain instances, the insurance claim may be incomplete or contain irrelevant information relating to the damaged vehicle or accident. For example, it may be difficult to determine liability of the customer due to inadequate information, although there may be substantial damage to the insured vehicle. As such, any unnecessary delay or incomplete understanding of the traffic incident can adversely impact the customer's experience through the insurance claims process.

SUMMARY

In some implementations, the current subject matter relates to a computer implemented method for recreating an event. The method can include receiving a plurality of data from a plurality of sources of information, the plurality of data describing an event, each data in the plurality of data having a different format, converting each data in the plurality of data into a predetermined format and combining the converted received plurality of data, generating, based on the combined converted received data, a report describing a recreation of the event; and transmitting the generated report for display on at least one user interface. At least one of the receiving, the converting, the generating, and the transmitting can be performed by at least one processor of at least one computing system.

In some implementations, the current subject matter can include one or more of the following optional features. The plurality of sources can include a plurality of sensors communicatively coupled to the at least one computing system (e.g., rendering system 102). The plurality of sensors can detect and record information about the event.

In some implementations, the data can include at least one of the following: a video data, an audio data, a text data, a photographic data, and any combination thereof.

In some implementations, the generated report can be transmitted for display using a first user interface associated with a first user device (e.g., user device 104) and for display using a second user interface associated with a second user device (e.g., user device 106). The first and second user devices can be communicatively coupled to the at least one computing system using a network.

In some implementations, the method 800 can further include receiving changes to the generated report from the second device, generating, based on the received changes, a new report and transmitting the new report to the first user device and the second user device, receiving a confirmation, from the second device, indicating that the new report has no changes, and transmitting the confirmation to the first device.

In some implementations, the report can include at least one of the following: a data describing the event, a video illustrating the event, an audio describing the event, an animation illustrating the event, a narrative textual data describing the event, and any combination thereof.

In some implementations, the event can be a vehicular accident. In that case, the plurality of sensors can include at least one of the following: a vehicle blackbox sensor, a mobile device, a vehicle onboard usage-based insurance enable device, and a vehicle onboard sensor. The generated report can be transmitted to a claimant user device for display on a user interface associated with the claimant user device, wherein the claimant user device is used to record data describing the vehicular accident. The claimant user device can be communicatively coupled to the computing system for submission of at least one insurance claim as a result of the vehicular accident. A claims adjuster device can receive the generated report for processing of the insurance claim.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
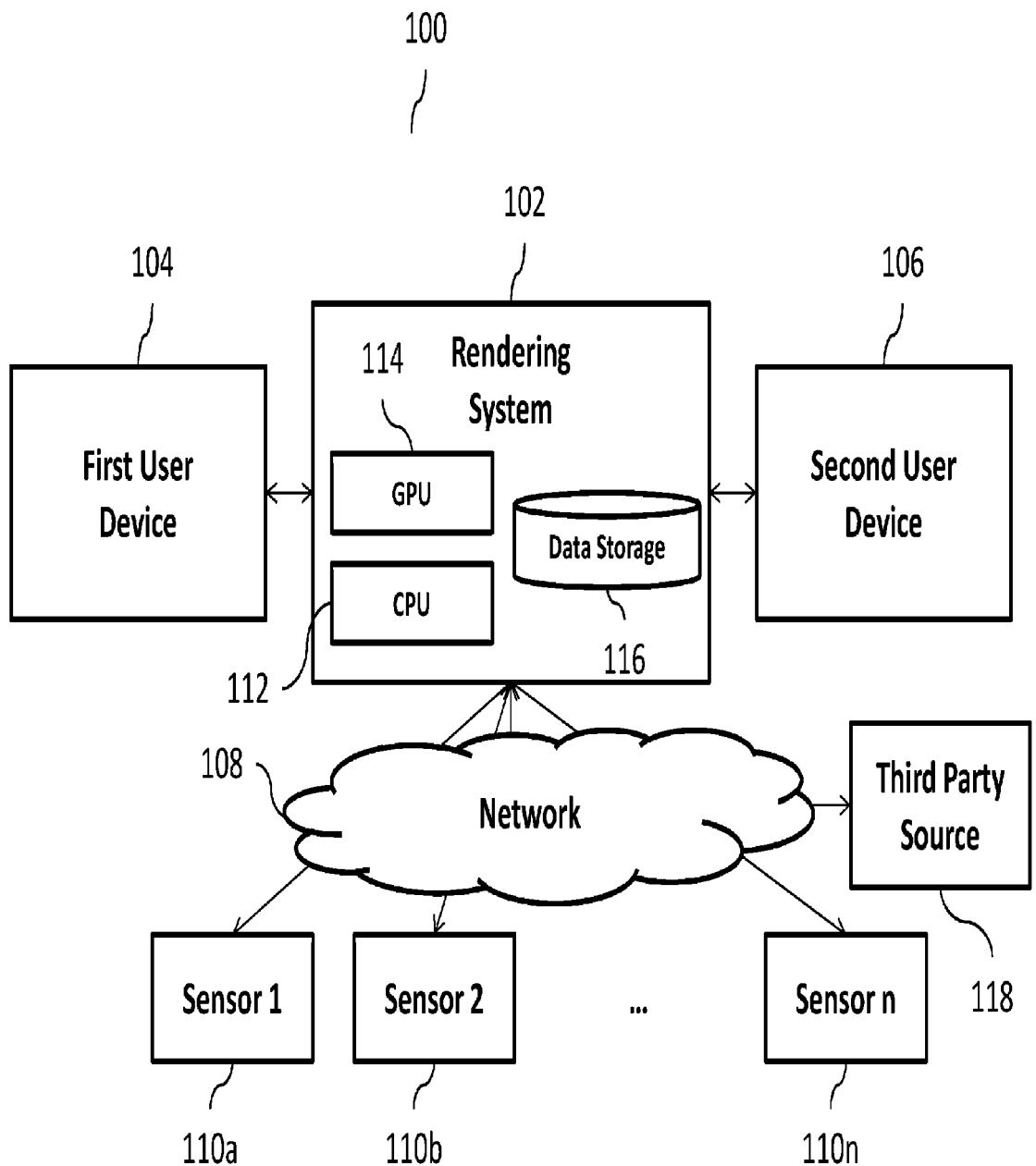
FIG. 1 illustrates an exemplary system for recreating an event, according to some implementations of the current subject matter.

In some implementations, the current subject matter relates to recreating an event, including providing a graphical and information representation of the circumstances associated with the event along with any details that may be pertinent to the understanding of what transpired during such event. The event can include at least one of the following: a traffic accident, a property damage, a personal injury, a crime, and/or any other event. The representation of the event can be based on at least one of the following: data describing the event, audio and/or video information associated with the event, written narrative information, information obtained from third party sources (e.g., the Internet, news sources, etc.) and/or any other information. The information can be obtained from one or more participants of the event, observers of the event, third parties, etc. The information can be transmitted using wired, wireline, and/or wireless networks, local area networks ("LAN"), metropolitan area networks ("MAN"), wide area networks ("WAN"), the Internet, and/or any other networks. In some exemplary implementations, reconstruction of the event can be useful during a claim process that is designed to provide a monetary benefit to a holder of an insurance policy. For illustrative, nonlimiting purposes only, the following discussion is presented in connection with such insurance claims process, where the event is an automotive accident and the insurance claim process relates to making a claim by a holder of an automotive insurance as a result of such accident. However, as can be understood, the current subject matter can be applicable to reconstruction of any event for any purpose.

In some implementations, as part of an insurance claims process, the current subject matter can render data for displaying a representation of a traffic incident recreation on a client computing device. The current subject matter can reconstruct a vehicular accident using data from one or more sensor devices of one or more client computing devices (e.g., accelerometer, gyroscope, camera, audio capture element, GPS, etc.) including data from a vehicle on-board computer and/or data from usage-based insurance ("UBI") enabled devices. The representation of the traffic incident recreation can include an animation in two-dimensional and/or three-dimensional space. The traffic incident recreation can be sent to a claims adjuster handling the insurance claim.

The current subject matter can provide several advantages including use of sensor data captured at the time of an accident to determine contextual information relating to the cause and/or result of the accident, enabling a user or insurance provider agent (e.g., the claims adjuster) to view an animation of the vehicular accident to add context before and after the accident, facilitating processing of an insurance claim by the insurance provider and/or third parties associated with the accident, and/or promoting cost conservation by enabling the insurance provider to cut down on investigation costs.

In some implementations, the current subject matter can provide a rendering of a visual representation of a traffic incident recreation for display to a user. The current subject matter can be implemented on one or more computing devices (e.g., servers) in communication with a network. The current subject matter can be associated with an insurance platform provided by an insurance company and can include one or more server machines affiliated with the insurance company. Further, the current subject matter can belong to an insurance company and/or another party associated with an insurer. In some implementations, the current subject matter can be implemented on a desktop computer, a laptop, a mobile device, a tablet, a mobile telephone, a smartphone, and/or any other computing device.

In some implementations, the current subject matter can be communicatively coupled to one or more client computing devices over a network. The client computing devices can be associated with a user or customer (e.g., policyholder). The client computing device can be a mobile device that can include at least one of the following: a smartphone, a mobile telephone, a tablet, a laptop, a desktop computer, a camera device, a UBI-enabled device, and/or any other device, and/or any combination thereof, capable of communicating with other devices via the network.

In some implementations, the current subject matter can include a software application running on the mobile device that can access various capabilities of the mobile device and/or capabilities of devices in communication with the mobile device. For example, the application can obtain sensor data from one or more sensor devices located on the mobile device and/or located on one or more client computing devices in communication with the mobile device. The application can access one or more cameras on the mobile device (e.g., a front-facing camera and/or a rear-facing camera), microphones on the mobile device, and/or other sensor devices. The one or more sensor devices can include an image capture element (e.g., a camera), an audio capture element (e.g., microphone), a gyroscope, an accelerometer, infrared sensors, and/or a global positioning system.

The sensor data can include audio and/or video content that can be provided by a camera. The audio/video content can provide the insurance provider with a record of events from the viewpoint of the mobile device located in the insured vehicle in the event that a traffic incident (e.g., an accident) occurs and/or any other time. The sensor data can also include location information from a global positioning system ("GPS") device that can be integrated into the mobile device and/or in communication with the mobile device. The location information (e.g., GPS coordinates) and/or any other data obtained by the GPS device can be used to provide the insurance provider with additional information associated with the traffic incident.

In some implementations, the sensor devices can include at least one of the following: a recording device located on-board of a vehicle that can be communicatively coupled to the system. The recording device on-board the vehicle can be accessed through a communication link (e.g., UBI). The on-board vehicle recording device can record data associated with actions performed as part of the operation of the vehicle. For example, the recording data can include information relating to the velocity of the vehicle, location of the vehicle, weather and traffic conditions (via a third party service provider), zoning information, throttle position, torque information, fault codes, messages, vehicle service information, and/or any other information.

In some implementations, the user (and/or policyholder) can be asked to submit login credentials for an account associated with the user. The account can be viewed and/or accessed by the user via the software application and/or a website portal on the network. The current subject matter can cause a prompt to be displayed on a display screen of the mobile device. For example, the prompt can include fields to enter an email address (or username) including a password for the account. The prompt can be part of a splash page provided for display with the software application and/or the website portal. The splash page can include information relating to legal disclaimers and/or additional information relating to the insurance provider. Upon login, the current subject matter can also display the customer's insurance policy information.

The software application can facilitate receipt of the obtained sensor data for reconstructing a vehicular accident as an animation. The application can be installed on the mobile device that can include instructions (and/or prompts) to guide the user to upload the sensor data and/or add additional information relating to the insurance claim. The software application can include a prompt requesting permission from the user to upload the sensor data. In some implementations, the software application can include a status page including an animation that represents real-time feedback of the uploading process. The software application can include an additional splash page providing an indication that the upload to the system was successful. The upload result can include a summary of information relating to the uploaded sensor data. The software application can include a prompt requesting the user to verify (and/or confirm) the uploaded sensor data. The user can be provided with an option to edit (and/or change) any of the uploaded data and/or proceed to the next step in the process. In some implementations, the software application can pull the sensor data automatically from the sensor devices. In alternate implementations, the sensor devices can automatically send the sensor data to the application.

In some implementations, the current subject matter can generate rendered data based on the sensor data uploaded from the application to display a visual representation of a traffic incident recreation on a display screen of the mobile device and/or a display associated with the claims adjuster. The uploaded sensor data can include image information, audio/video information, location information, and/or any other information. The current subject matter can use one or more algorithms related to image processing, voice recognition processing, orientation processing and/or navigation processing to determine features included in the sensor data. The features can include spatial and/or temporal information to recreate the visual representation of the reconstructed traffic incident.

The traffic incident recreation can include mapping information and/or object information in two-dimensional space or three-dimensional space, and/or a combination thereof. For example, the traffic incident recreation can show as time-lapse animation one or more events leading up to the traffic incident, the traffic incident event, and/or one or more events following the traffic incident. The sensor data provided in the upload can facilitate in recreating the amount of damage caused to the insured vehicle and/or other third party vehicles involved.

In addition, the sensor data can facilitate in defining the rate of movement of the insured vehicle including the amount of force generated by the traffic incident. The traffic incident recreation can assist the claims adjuster in determining a root cause of the accident, the parties likely to have liability implications, and/or the amount of damaged suffered by each of the parties involved.

In some implementations, the current subject matter can send the rendered data to a client computing device associated with a requesting user to verify the rendered data. The current subject matter can request the user to confirm the accuracy of the uploaded sensor data. The current subject matter can request (and/or prompt) the user to add additional information to facilitate the rendering process. The current subject matter can also request the user to edit any existing information included in the uploaded sensor data.

The software application can include a page requesting the user to submit additional information relevant to the traffic incident. For example, the page can include a prompt to record audio data from observing witnesses, a prompt to enter witness information, a prompt to submit a drawing (or sketch) of the traffic incident, a prompt to submit additional notes relating to the traffic incident, and/or a prompt to submit a photo and/or audio/video relating to the traffic incident. The software application can communicate with one or more servers to process the uploaded data and/or render data for visual display of the traffic incident recreation. The software application can interface with a communication channel to send (and/or upload) the received data. The software application can include a page providing real-time feedback of the transmission of the data to the system.

In some implementations, the current subject matter can send the rendered data to a client computing device associated with a claims adjuster. A similar notification can be sent to the claims adjuster to advise the claims adjuster that the traffic incident recreation is available for viewing. In some implementations, the notification to the claims adjuster can include an indication that the traffic incident recreation is subject to final confirmation by the user. The claims adjuster can be associated with the insurance provider, an entity that is part of the system or part of a different machine-implemented system in other aspects of the subject technology.

In some implementations, the current subject matter can receive an indication that the requesting user verified the rendered data. The current subject matter can send an acknowledgment back to the application to indicate that the verification of the uploaded data is complete. Further, current subject matter can send a follow-up notification to the claims adjuster that the uploaded data has been confirmed by the user.

In some implementations, the current subject matter can send a notification to the application that can include an indication that the rendered data is complete and available for viewing. The notification can cause a prompt to be displayed to enable the user to select to view the traffic incident recreation. The notification can include a prompt to save the traffic incident recreation in a memory of the mobile device or other memory communicatively coupled to the mobile device (e.g., cloud storage, flash drive). The notification can also cause a prompt to be displayed to enable the user to share the traffic incident recreation with other users associated with the user over a network (e.g., a social network).

In some implementations, the rendered data can be stored in one or more repositories associated with the insurance provider. In this regard, the rendered data can be associated with an insurance claim being processed by the insurance provider. The current subject matter can store the rendered data (or traffic incident recreation) at the server for a period of time (e.g., 1 week). The rendered data can be logged and attached to an existing insurance claim with the consent of the customer. After the period of time expires, the rendered data can be deleted. By deleting the rendered data after a period of time, the current subject matter can help reduce privacy concerns associated with keeping the rendered data indefinitely or for longer period of time.

FIG. 1 illustrates an exemplary system 100 for recreating an event, according to some implementations of the current subject matter. The system 100 can include a rendering system 102, a first user (e.g., a claimant) device 104, a second user (e.g., a claims adjuster) device 106, and a plurality of sensors 110a, 110b, ... 110n. The rendering system 102 can include one or more servers that can have one or more processors 112, one or more graphics processors 114, one or more data storage components 116, communication capabilities (e.g., wired, wireline, and/or wireless), as well as any other components, and/or any combination thereof. The rendering system 102 can be communicatively coupled to the first user device 104 and the second user device 106. The rendering system 102 and the devices 104, 106 can be communicatively coupled using a wired, wireline, and/or wireless network, which can include at least one of the following: a virtual network, Internet, intranet, extranet, MAN, WAN, LAN, and/or any combination thereof.

The devices 104, 106 can include at least one of the following: a mobile telephone, a mobile device, a smartphone, a tablet, a desktop computer, a laptop, a personal digital assistant ("PDA"), a scanner, a monitor, and/or any other device and/or any combination thereof. The devices 104, 106 can be any combination of software and/or hardware and can include one or more software applications being executed on the devices 104, 106 that can allow communication and processing of the data exchanged between the devices 104, 106, the rendering system 102, and the sensors 110.

The rendering system 102 can be communicatively coupled with one or more sensors 110 via one or more communication networks 108. The network 108 can be a wired, wireline, and/or wireless network, which can include at least one of the following: a virtual network, Internet, intranet, extranet, MAN, WAN, LAN, and/or any combination thereof. The sensors 110 can be used to gather various data related to the event for processing and recreation by the rendering system 102. The sensors 110 can collect at least one of the following: an audio data, a video data, a photographic data, global positioning system coordinates, data related to the participants of the event, data related to the observers of the event, textual data (e.g., written narrative information, a witness statement, etc.), data/information obtained from third party sources 118 (e.g., news sources, government agencies, etc.) and/or any other data/information, and/or any information thereof. The data/information can be obtained automatically, entered manually, obtained as a result of a trigger associated with the event (e.g., preceding the event, occurring during and/or after the event, etc.), as a result of a request made (e.g., by the rendering system 102, and/or any devices 104, 106), etc.

In some implementations, the rendering system 102, using one or more of its processors 112, 114, can receive the data from the sensors 110 and/or the user device 104 for processing. The processors 112, 114 can analyze received data and generate one or more reports, which can be displayed on one or more user interfaces on the devices 104, 106 and/or any other devices that may be communicatively coupled to the rendering system 102. The reports can be transmitted over communication networks connecting the devices 104, 106 to the rendering system 102.

To generate a report based on the received information, the rendering system 102 can recognize the information and/or data that are being received from the sensors 110 and/or devices 104, 106 and/or any other third party sources. The rendering system 102 can recognize information/data (e.g., data packets) based on the data identifiers contained in the transmitted information/data. In some exemplary implementations, the rendering system 102 can perform a shallow packet inspection and a deep packet inspection of data packets that it receives to extract various information, which can be used to determine the origin of the information/data, its content, and/or any other information that the rendering system 102 can use for any further processing. Based on the extracted information/data, the rendering system 102 can determine how to assemble the information and/or create a report for transmission to the devices 104, 106.

The rendering system 102 can further determine that in order to generate a report, it needs additional information. To obtain such additional information, the rendering system 102 can forward a request (e.g., a hypertext transfer protocol ("HTTP") request, etc.) to the sensors 110, devices 104, 106, and/or any other third party sources, to provide such information. The rendering system 102 can also determine which the sensors 110, devices 104, 106, and/or any other third party sources 118 can possess the additional information and, upon such determination, the rendering system 102 can appropriately format its request for additional information and forward same to the determined/selected source. Alternatively, the rendering system 102 can broadcast its request for additional information to all available sources of information.

Once the information/data and/or any additional information/data are received, the rendering system 102 can combine the information/data into the report. The rendering system 102 can use one or more templates to compile information together and organize it into a report. The templates can be specific to a particular event, for which the rendering system 102 can generate a report, and can include a plurality of data fields that can be populated with the received information/data. For example, if the event is a vehicular accident, the rendering system 102 can select a vehicular accident report template, which can include at least one of the following data fields: vehicle information, driver information, speed of the vehicle involved in the accident, location of the accident, time of the accident, weather at the time of the accident, traffic level in the area of the accident, presence of construction in the area of the accident, throttle position at the time of (and/or prior to, after) the accident, vehicle torque at the time of (and/or prior to, after) the accident, trouble codes, etc., and/or any combination thereof. If the event relates to the property damage, the rendering system can select a property damage report template, which can include at least one of the following data fields: property address, owner information, age of the property, type of damage (e.g., flood, fire, etc.), weather conditions at the time of (and/or prior to, after) the occurrence of damage, etc., and/or any combination thereof. In some implementations, the rendering system 102 can create templates for different types of events to accommodate generation of reports. In some implementations, the rendering system 102 can generate reports without use of templates and provide such reports to devices 104, 106 in free form.

In some implementations, the sensors 110 can detect and/or gather information/data relating to and depending on a type of the event. The sensors 110 can be communicatively coupled to the devices 104, 106 and can receive and/or transmit information from and/or to the devices 104, 106. The sensors 110 can be used to detect and/or obtain various information that can depend on the event. Once the information is obtained by the sensors 110, the sensors 110 can transmit the information/data to the rendering system 102 and/or devices 104, 106. Upon receipt of the information/data, the rendering system 102 can format the received information/data for further processing. The information/data can be transmitted by the sensors 110 in a sensor-native format and/or can format the information/data to a predetermined format prior to transmission to the rendering system 102 and/or devices 104, 106.

In some implementations, the sensors 110 can be activated as a result of the occurrence of the event and record information/data. Alternatively, the sensors 110 can record information a predetermined amount of time prior to the time of the event, during the event and/or a predetermined amount of time after the occurrence of the event. For example, if the event is a vehicular accident, the sensors 110 can record information/data about what happened prior to the accident (e.g., 15 minutes prior to the accident, the vehicle was driving at 55 mph on a three-lane highway, traffic was moving smoothly, no construction present, weather was calm and sunny at 68° F., etc.), what happened at the time and/or during the accident (e.g., the vehicle hit another vehicle driving at 45 mph, heavy rain began to fall, etc.), and what happened after the accident (e.g., another vehicle hit the drivers' side 30 seconds after the occurrence of the initial accident, etc.). In some implementations, the sensors 110 can continuously record information without being limited to any particular period of time.

In an exemplary implementation where the event is a vehicular accident, the sensors 110 can include at least one of the following: a speed sensor, a fuel sensor, a torque sensor, a rear-view camera, a brake sensor, a weather sensor, a tire pressure sensor, and/or any other vehicle sensor. Additionally, the sensor 110 can include a detector device that can be plugged into vehicle diagnostic port for the purposes of gathering information, a sensory sticker placed on a windshield of or anywhere on the vehicle, and/or any other sensory device. Additionally, the driver's communications device (e.g., a mobile telephone, a smartphone, a tablet, a personal computer, a laptop, etc.) can be used as one of the sensors 110 that can provide information to the rendering system 102 and/or communicate with one or more of the other sensors 110. The driver's communications device can also be the device 106. The device 106 can be used to record video, audio, a written narrative and/or any other information about the event. For example, a party and/or a witness to the vehicular accident can be interviewed using the device 106, the driver (e.g., an insured, a claimant, etc.) of the vehicle can record a statement about the accident (which can include a video, an audio, a photograph, a written (typed and/or handwritten) narrative, etc.) using the device 106, and/or any other information/data can be recorded.

Once the information/data about the event is gathered from the sensors 110, the device 106 and/or a third party source 118, and/or from any other source, it can be forwarded to the rendering system 102 for processing and generation of a report. In some implementations, the device 106 can be provided with a software application (e.g., a mobile application that can be downloaded to the device 106) having one or more user interfaces, which the user can use to access the application and submit data relating to the event. In order to submit information, the user can be prompted to enter login credentials to access the software application, submit information/data, and/or view any reports that may have been generated by and forwarded to the device 106 the rendering system 102. In the exemplary implementation of an insurance claim relating to a vehicular accident, the user can also use the software application to edit the information contained in the report generated by the rendering system 102 and/or verify that the report is accurate as well as submit an insurance claim to an insurance company's claims adjuster (e.g., device 104).

Figure 2:
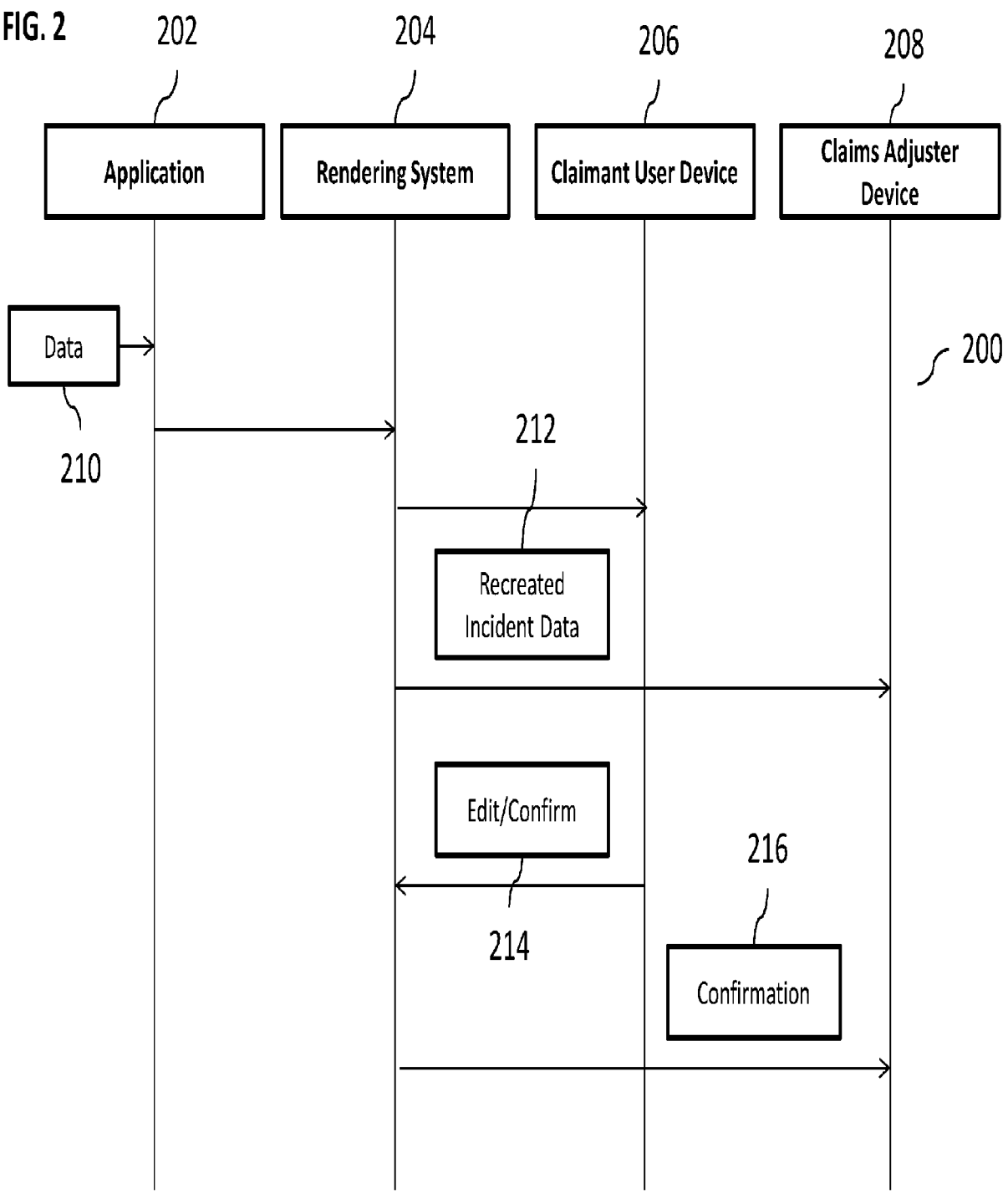
FIG. 2 illustrates an exemplary system for recreating an event, according to some implementations of the current subject matter.

FIG. 2 illustrates an exemplary system 200 for recreating an event, according to some implementations of the current subject matter. For ease of illustration only, the system 200 will be discussed in connection with a vehicular accident. The system 200 can include a mobile application 202, a rendering system 204, a claimant user device 206, and a claims adjuster device 208. The components 202-208 can be communicatively coupled using a network, which can include at least one of the following: a wired network, a wireless network, a virtual network, Internet, intranet, extranet, MAN, WAN, LAN, and/or any combination thereof. The process can begin by uploading various information from vehicle sensors, which can include at least one of the following: a vehicle blackbox, a mobile device, a vehicle onboard UBI, vehicle onboard sensors, etc., as well as information recorded by the driver of the vehicle, which can include at least one of the following: a video, a photograph, an audio, witness statement(s), etc. The information can be uploaded using the application 202 (which can be downloaded on the driver's mobile device and can be the same as the claimant user device 206) upon entry of appropriate login credentials by the driver. The login credentials can be associated with a particular automobile insurance police held by an insurance company (which the claims adjuster device 208 can represent) covering the vehicle. Once the information has been submitted through the application 202, the application 202 can send the uploaded information to the rendering system 204 (similar to the rendering system 102 shown in FIG. 1).

The rendering system 204 can then render the received information and render it into recreation of a vehicular accident. The rendering system 204 can use its data and graphic processing components (e.g., CPU 112, GPU 114, database 116, etc. as shown in FIG. 1) to process and generate a recreation of the accident. Once the recreation is complete, the recreated incident data in the form of a report can be transmitted to the claimant user device 206 for display and/or editing and/or confirming that the information contained in the report is correct. The report can also be forwarded to the claims adjuster device 208 with an indication that the report is not a final report and is pending approval/edits by the claimant user device 206.

Figure 4:
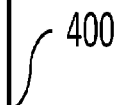
FIG. 4 illustrates an exemplary user interface that can be displayed on a claimant user device, according to some implementations of the current subject matter.

Using the claimant user device 206, the user of the device can make changes to the report and/or submit additional information. The report can be presented on the claimant user device 206 can be presented with the report using one or more user interfaces. An exemplary user interface 400 that can be displayed on the claimant user device 206 is shown in FIG. 4. The report indicates contains various fields that show information associated with the accident and provides the user with an opportunity to "EDIT" the report or "ACCEPT" the report as presented. Should the user of the claimant user device 206 determines that some or all information is incorrect and/or additional information can be added, the user can choose to "EDIT" the report and can be prompted to another user interface that can allow the user to make changes/submitadditional information.

Figure 5:
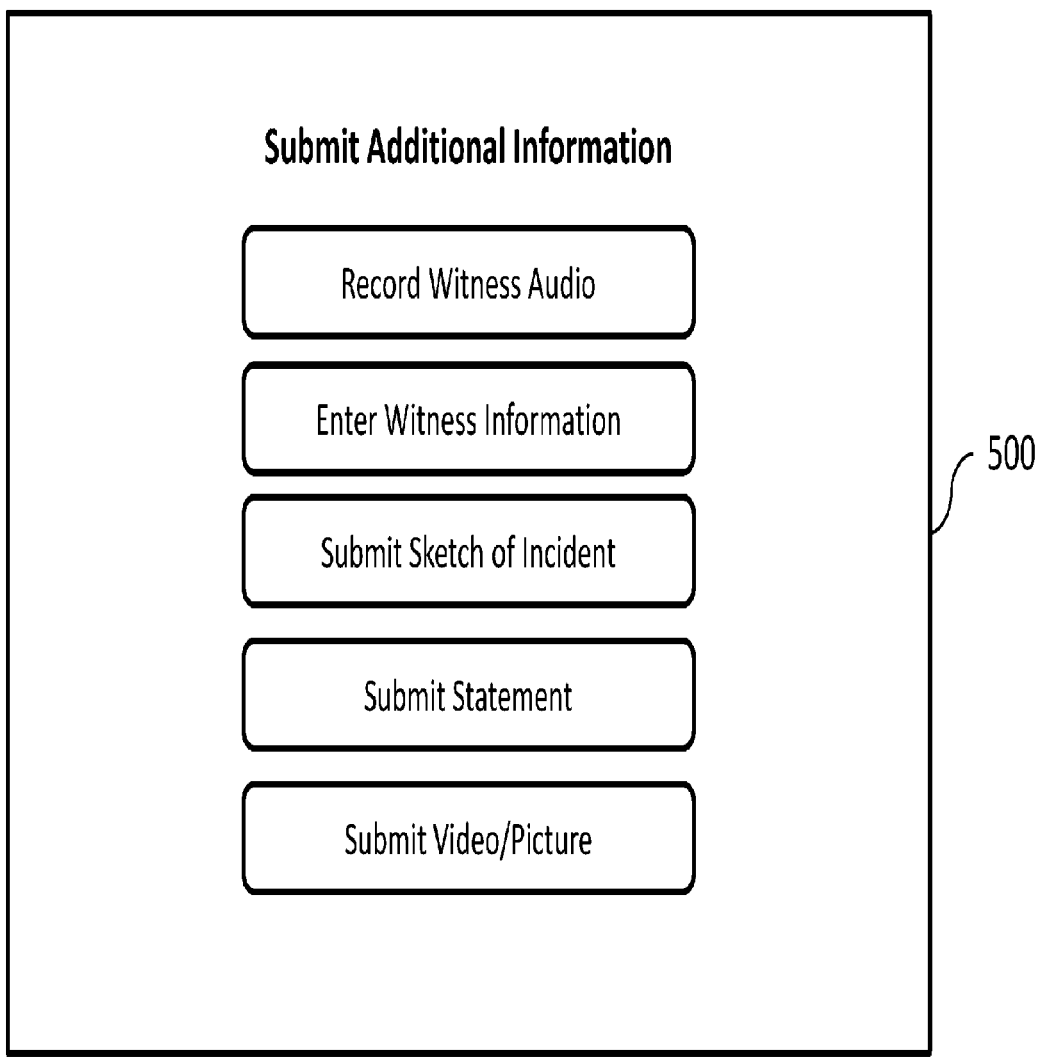
FIG. 5 illustrates an exemplary user interface that can be displayed on the claimant user device and that can allow the user to provide additional information, according to some implementations of the current subject matter.

FIG. 5 illustrates an exemplary user interface 500 that can be displayed on the claimant user device 206 and that can allow the user to provide additional information. The user interface 500 can be presented to the user prior to, during, and/or after sending information about the accident to the rendering system 204. The user can be provided with at least one of the following exemplary options: "Record Witness Audio", "Enter Witness Information", "Submit Sketch of Incident", "Submit Statement", "Submit Video/Picture," and/or any other options for changing and/or adding information to the report. The user can click or touch one of these options to submit requisite information/data. The changes/additional data can be transmitted to the rendering system 204. The system 204 can process the changes and generate a revised and/or new report and transmit it back to the claimant user device 206 and/or claims adjuster device 208. This process can be repeated until the user has no further changes and/or new information to submit.

Referring back to FIG. 2, once the user of the claimant user device 206 has no further changes and/or no additional information to submit to the rendering system 204, the user can indicate that the report generated by the rendering system 204 is accurate and transmit a confirmation (e.g., touching "CONFIRM" on the device 206, sending an email, a text message, a multi-media message, etc.) to the rendering system 204. Once the rendering system 204 receives confirmation from the claimant user device 206, the rendering system 204 can store the final report (e.g., in the database 116 as shown in FIG. 1) and append the report to an insurance claim being made in connection with the accident. The rendering system 204 can also send the final report to the claims adjuster device 208 for viewing and/or processing in connection with the insurance claim. Alternatively, the rendering system 204 can send a notification (e.g., an email, a text message, etc. and/or any other type of alert) to the device 208 indicating that the final report is available forreview.

Figure 6:
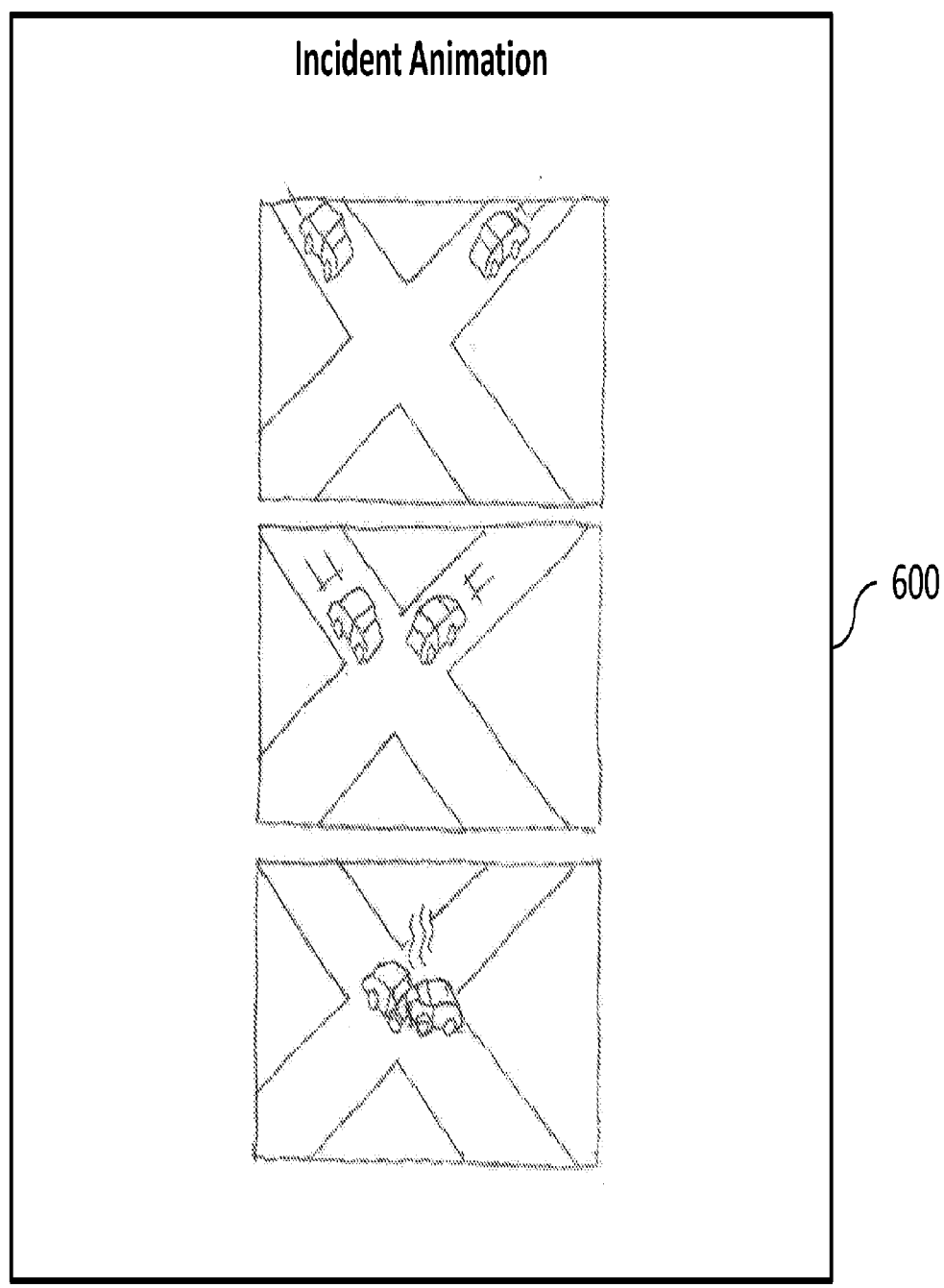
FIG. 6 illustrates an exemplary user interface showing various frames of the animation, according to some implementations of the current subject matter.

In some implementations, the rendering system 204 can also create an animation of the accident using its graphic processing capabilities (e.g., a GPU 114 as shown in FIG. 1). An exemplary user interface 600 illustrating various frames of the animation is shown in FIG. 6. The animation can be presented in separate picture frames and/or as a continuous video. The animation can be also transmitted and/or can be made available for access from a server to the claimant user device 206 and/or claims adjuster device 208.

Using the report, animation, and/or any other information generated by the rendering system 204, the user (e.g., a claims adjuster) of the claims adjuster device 208 can process the insurance claim to determine liability, payouts, etc. The system 200 can allow for more accurate recreation of the accidents and expedient processing of insurance claims.

Figure 3:
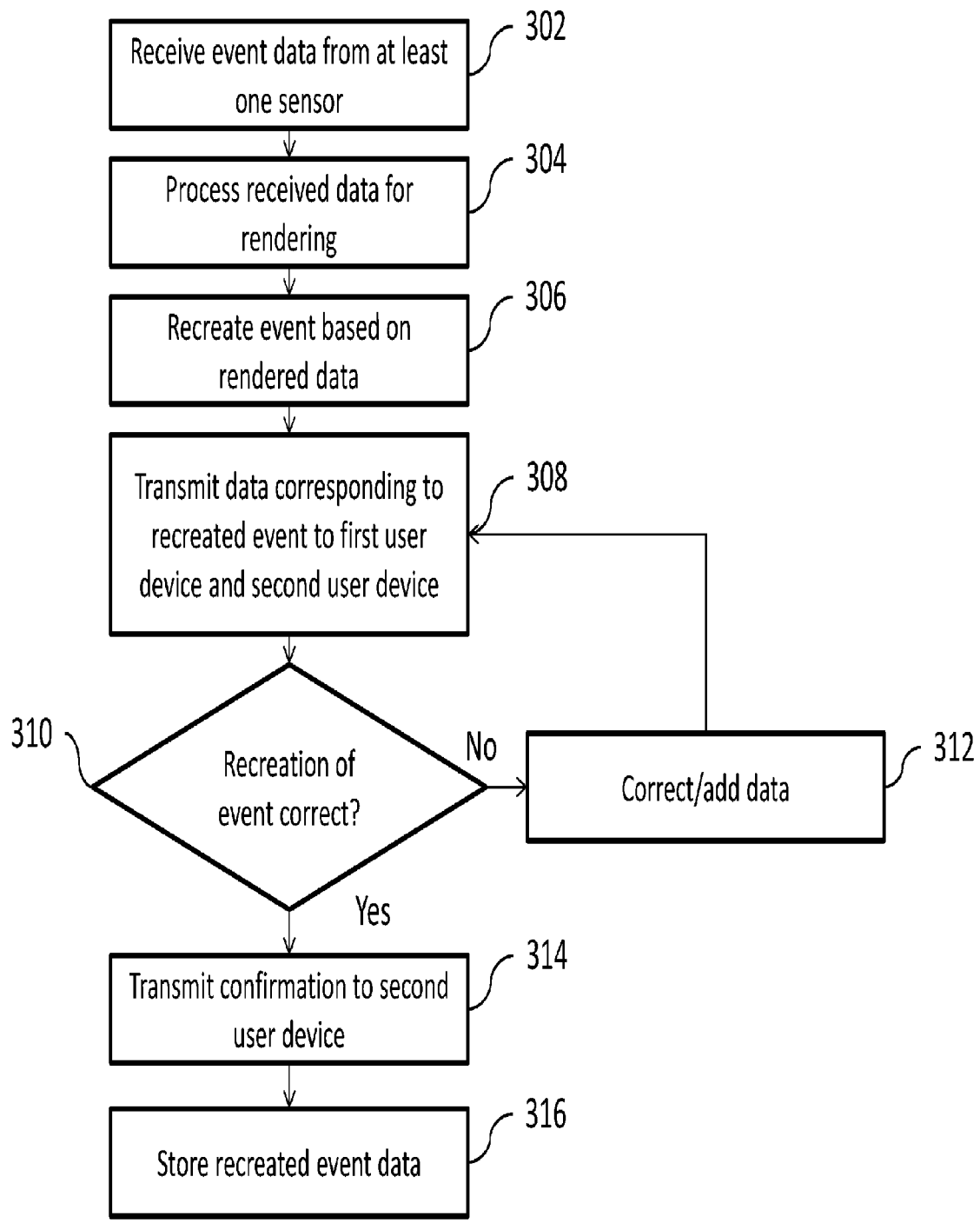
FIG. 3 illustrates an exemplary process for recreating an event, according to some implementations of the current subject matter.

FIG. 3 illustrates an exemplary process 300 for recreating an event, according to some implementations of the current subject matter. The process 300 can be performed by the system 100 shown in FIG. 1 and/or by the system 200 shown in FIG. 2. At 302, event data can be received from at least one sensor (e.g., sensor 110 as shown in FIG. 1). The received event data can be received by the rendering system (e.g., system 102 as shown in FIG. 1). The rendering system can process the received data, at 304. This can be accomplished using various data processors, graphic processors, databases, etc. Based on the received data, the rendering system can recreate the event (i.e., what happened during the event, prior to the event, and/or subsequent to the event), at 306. The recreation of the event can be compiled into a report, which can be transmitted to a first and second user devices (e.g., devices 104, 106 as shown in FIG. 1), at 308. At 310, a determination can be made as to whether or not the report generated by the rendering system is correct. The determination can be performed by the second user device (e.g., device 106) and transmitted to the rendering system. If the data is not correct, the second user device can be used to correct/add the report and the corrected/added information can be transmitted to the rendering system, at 312. If it is correct, then the rendering system can receive an appropriate confirmation from the second user device and transmit an indication the generated report is correct, as having been confirmed by the second user device, at 314. The rendering system can store (e.g., a database 116 as shown in FIG. 1) the report containing the recreated event, at 316.

Figure 7:
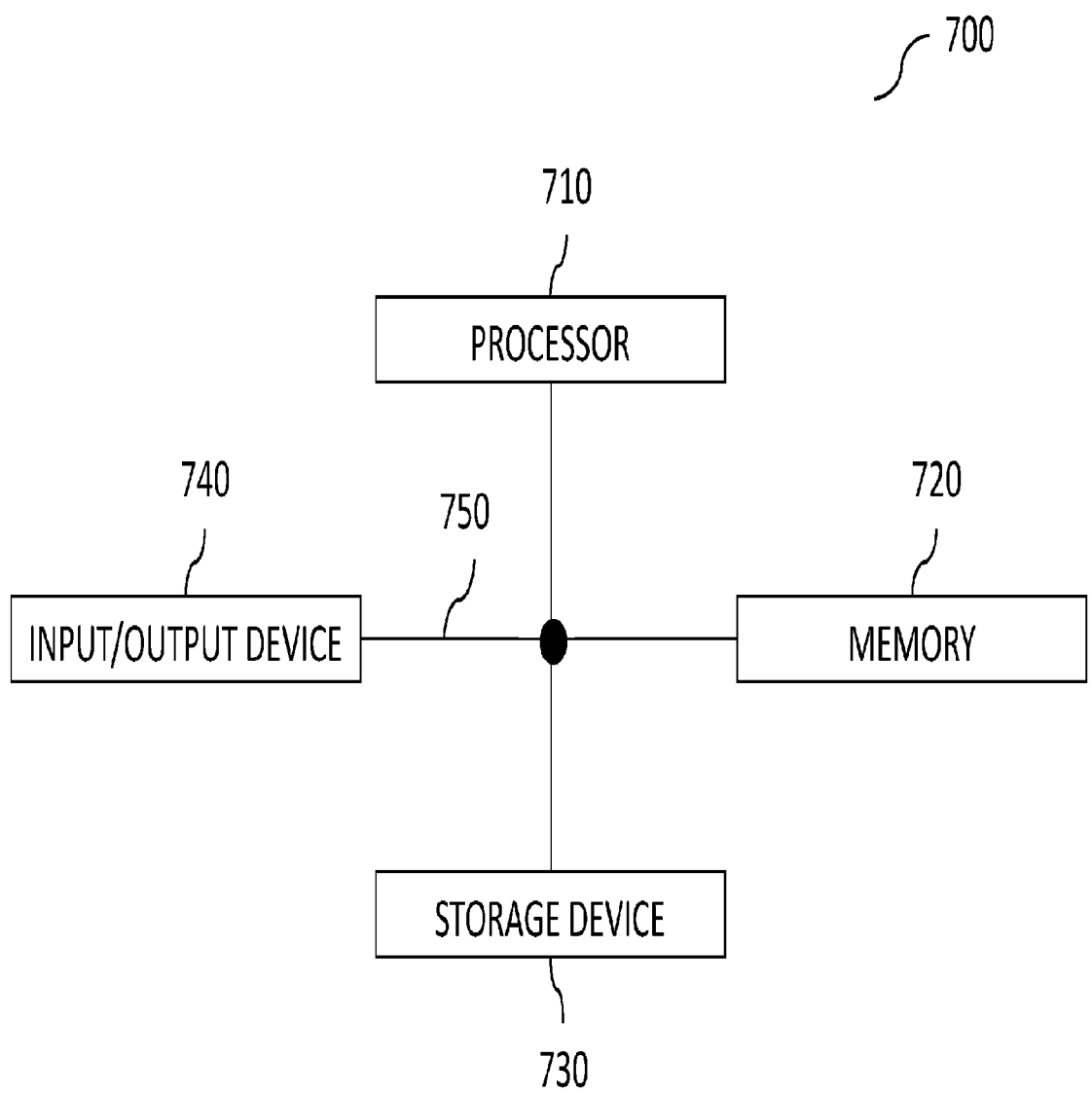
FIG. 7 illustrates an exemplary system, according to some implementations of the current subject matter.

In some implementations, the current subject matter can be configured to be implemented in a system 700, as shown in FIG. 7. The system 700 can include a processor 710, a memory 720, a storage device 730, and an input/output device 740. Each of the components 710, 720, 730 and 740 can be interconnected using a system bus 750. The processor 710 can be configured to process instructions for execution within the system 700. In some implementations, the processor 710 can be a single-threaded processor. In alternate implementations, the processor 710 can be a multi-threaded processor. The processor 710 can be further configured to process instructions stored in the memory 720 or on the storage device 730, including receiving or sending information through the input/output device 740. The memory 720 can store information within the system 700. In some implementations, the memory 720 can be a computer-readable medium. In alternate implementations, the memory 720 can be a volatile memory unit. In yet some implementations, the memory 720 can be a non-volatile memory unit. The storage device 730 can be capable of providing mass storage for the system 700. In some implementations, the storage device 730 can be a computer-readable medium. In alternate implementations, the storage device 730 can be a floppy disk device, a hard disk device, an optical disk device, a tape device, non-volatile solid state memory, or any other type of storage device. The input/output device 740 can be configured to provide input/output operations for the system 700. In some implementations, the input/output device 740 can include a keyboard and/or pointing device. In alternate implementations, the input/output device 740 can include a display unit for displaying graphical user interfaces.

Figure 8:
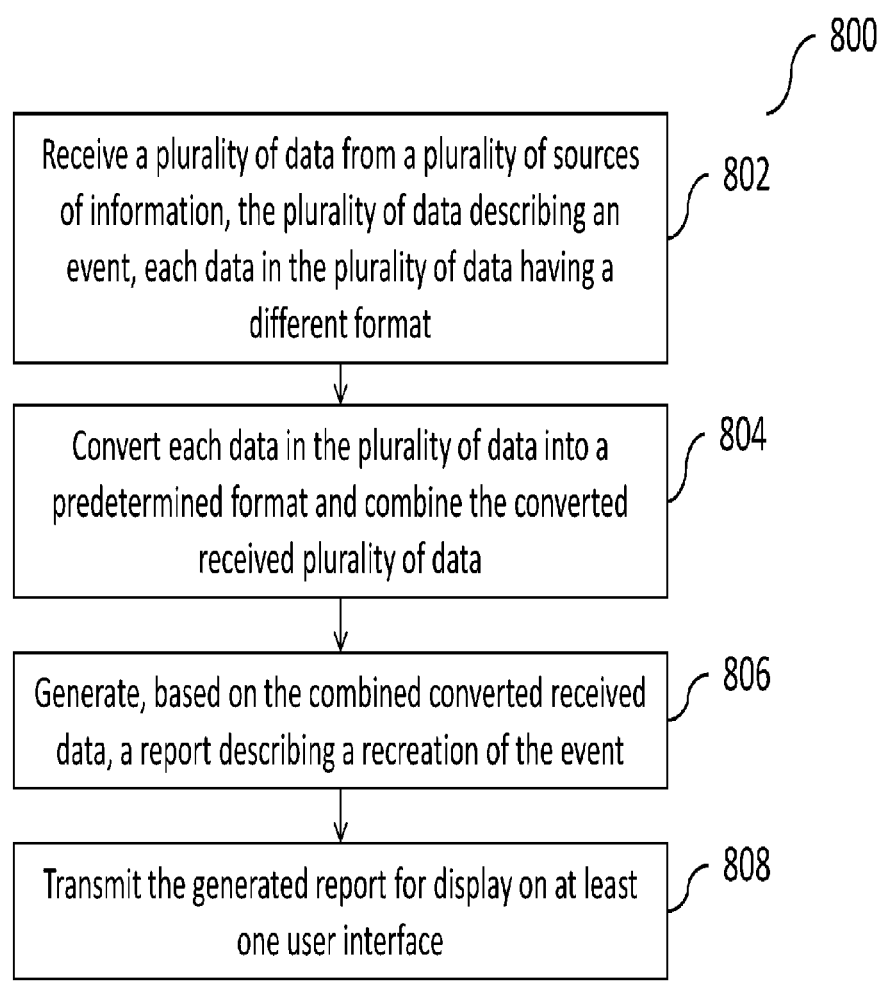
FIG. 8 illustrates an exemplary method, according to some implementations of the current subjectmatter.

FIG. 8 illustrates an exemplary method 800, according to some implementations of the current subject matter. The method 800 can be performed by the system 100, as shown in FIG. 1. At 802, a plurality of data can be received from a plurality of sources of information. The data can describe an event, where the data can have a different format. At 804, each received data can be converted into a predetermined format (which can be determined by the rendered system 102 as shown in FIG. 1) and, once converted, the data can be combined. At 806, a report describing a recreation of the event can be generated based on the combined converted received data. The rendering system 102 can perform conversion of data, processing of data and generation of the report (e.g., a vehicle accident report). At 808, the generated report can be transmitted for display on at least one user interface (e.g., user interface of the devices 104, 106 as shown in FIG. 1).

In some implementations, the current subject matter can include one or more of the following optional features. The plurality of sources can include a plurality of sensors communicatively coupled to the at least one computing system (e.g., rendering system 102). The plurality of sensors can detect and record information about the event.

In some implementations, the data can include at least one of the following: a video data, an audio data, a text data, a photographic data, and any combination thereof.

In some implementations, the generated report can be transmitted for display using a first user interface associated with a first user device (e.g., user device 104) and for display using a second user interface associated with a second user device (e.g., user device 106). The first and second user devices can be communicatively coupled to the at least one computing system using a network.

In some implementations, the method 800 can further include receiving changes to the generated report from the second device, generating, based on the received changes, a new report and transmitting the new report to the first user device and the second user device, receiving a confirmation, from the second device, indicating that the new report has no changes, and transmitting the confirmation to the first device.

In some implementations, the report can include at least one of the following: a data describing the event, a video illustrating the event, an audio describing the event, an animation illustrating the event, a narrative textual data describing the event, and any combination thereof.

In some implementations, the event can be a vehicular accident. In that case, the plurality of sensors can include at least one of the following: a vehicle blackbox sensor, a mobile device, a vehicle onboard usage-based insurance enable device, and a vehicle onboard sensor. The generated report can be transmitted to a claimant user device for display on a user interface associated with the claimant user device, wherein the claimant user device is used to record data describing the vehicular accident. The claimant user device can be communicatively coupled to the computing system for submission of at least one insurance claim as a result of the vehicular accident. A claims adjuster device can receive the generated report for processing of the insurance claim.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, LAN, WAN, and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A method, comprising
requesting a credential from a mobile device, the credential indicating user permission to upload data from a plurality of sources of information, the data associated with an event;
receiving the credential indicating the user permission to upload the data from the mobile device;
generating a first instruction for presentation at the mobile device, the first instruction generated in response to the credential and directing a first upload of at least a subset of the data;
identifying a viewpoint from the mobile device of the event based on the subset of the data;
generating a second instruction for presentation at the mobile device, the second instruction directing a second upload of an image from the viewpoint, the image captured by the mobile device;
generating converted data by converting data in the data into a predetermined format;
generating combined data by combining the converted data; and
generating based on the viewpoint and the combined data, a rendering of the event including a visual representation of the event.

2. The method according to claim 1, wherein the plurality of sources comprises at least one of a camera, a gyroscope, an accelerometer, infrared sensors, or a global positioning system.

3. The method according to claim 1, wherein the rendering is associated with an insurance claim associated with the event.

4. The method according to claim 1, further comprising:
deleting the rendering after a predetermined time period.

5. The method according to claim 1, wherein the visual representation is three-dimensional.

6. The method according to claim 1, wherein the combining the plurality of converted data comprises using a template associated with the event.

7. The method of claim 1, wherein the visual representation is a recreation of the event.

8. A system comprising:
at least one processor; and
a machine-readable medium storing instructions that, when executed by the at least one processor, cause the at least one processor to perform operations comprising:
generating a user interface for presentation at a mobile device, the user interface requesting user permission to upload data from a plurality of sources of information, wherein the data is associated with an event;
receiving, from the mobile device, a credential indicating the user permission to upload the data;
generating, based on the credential, a first instruction for presentation at the mobile device, the first instruction directing a user to upload at least a subset of the data;
determining, based on the subset of the data, a viewpoint from the mobile device of the event for generating a rendering of the event;
generating a second instruction for presentation at the mobile device, the second instruction directing the user to upload the viewpoint, the viewpoint captured by the mobile device;
generating converted data by converting the data into a predetermined format;
generating combined data by combining the converted data; and
generating, based on the viewpoint and the combined data, the rendering of the event, and wherein the rendering of the event is a visual representation of the event.

9. The system of claim 8, wherein the plurality of sources comprises at least one of a camera, a gyroscope, an accelerometer, infrared sensors, or a global positioning system.

10. The system of claim 8, wherein the rendering is associated with an insurance claim associated with the event.

11. The system of claim 8, wherein the operations further comprise:
deleting the rendering after a predetermined time period.

12. The system of claim 8, wherein the visual representation is three-dimensional.

13. The system of claim 8, wherein the converted data is combined using a template associated with the event.

14. The system of claim 8, wherein the visual representation is a recreation of the event.

15. One or more non-transitory computer-readable media storing instructions that, when executed by at least one processor, cause the at least one processor to perform operations comprising:
generating a user interface for presentation at a mobile device, the user interface requesting user permission to upload data associated with an event from a plurality of sources of information the plurality of sources of information including the mobile device;
generating, based on the user permission, a first instruction for presentation at the mobile device, the first instruction directing a first upload of at least a subset of the data;
receiving the subset of the data;
determining, based on the subset of the data, a viewpoint from the mobile device of the event needed to generate a report, the report comprising a rendering of the event;
generating a second instruction for presentation at the mobile device, the second instruction directing a second upload of the viewpoint, the viewpoint captured by the mobile device;
receiving, from the mobile device, the viewpoint;
converting the data into a predetermined format;
combining the data in the predetermined format into combined data; and
generating, based on the viewpoint and the combined data, the report, wherein the report comprises the rendering of the event, and wherein the rendering of the event is a visual representation of the event.

16. The one or more non-transitory computer-readable media of claim 15, wherein the plurality of sources comprises at least one of a camera, a gyroscope, an accelerometer, infrared sensors, or a global positioning system.

17. The one or more non-transitory computer-readable media of claim 15, wherein the rendering is associated with an insurance claim associated with the event.

18. The one or more non-transitory computer-readable media of claim 15, wherein the operations further comprise:
   deleting the rendering after a predetermined time period.

19. The one or more non-transitory computer-readable media of claim 15, wherein the visual representation is three-dimensional.

20. The one or more non-transitory computer-readable media of claim 15, wherein the visual representation is a recreation of the event.

* * * * *